(12) United States Patent
Kubo et al.

(10) Patent No.: US 11,367,868 B2
(45) Date of Patent: *Jun. 21, 2022

(54) SULFUR-BASED POSITIVE-ELECTRODE ACTIVE MATERIAL, POSITIVE-ELECTRODE AND LITHIUM-ION SECONDARY BATTERY

(71) Applicant: SUMITOMO RUBBER INDUSTRIES, LTD., Kobe (JP)

(72) Inventors: Tatsuya Kubo, Kobe (JP); Fumiya Chujo, Kobe (JP); Yasuhisa Minagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 39 days.

This patent is subject to a terminal disclaimer.

(21) Appl. No.: 16/673,146

(22) Filed: Nov. 4, 2019

(65) Prior Publication Data

US 2020/0152979 A1  May 14, 2020

(30) Foreign Application Priority Data

Nov. 12, 2018 (JP) .............................. JP2018-212308

(51) Int. Cl.
*H01M 4/02* (2006.01)
*H01M 4/04* (2006.01)
(Continued)

(52) U.S. Cl.
CPC ........... *H01M 4/38* (2013.01); *H01M 4/0471* (2013.01); *H01M 4/621* (2013.01); *H01M 4/622* (2013.01);
(Continued)

(58) Field of Classification Search
CPC ...... H01M 4/0471; H01M 4/13; H01M 4/136; H01M 4/137; H01M 4/139; H01M 4/1397;
(Continued)

(56) References Cited

U.S. PATENT DOCUMENTS 9,225,011 B2 * 12/2015 Wang ..................... H01M 4/625
10,033,046 B2 * 7/2018 Gumeci .................. H01M 4/38
(Continued)

FOREIGN PATENT DOCUMENTS

JP   2002-154815 A   5/2002
JP   2010-146908 A   7/2010
(Continued)

OTHER PUBLICATIONS

English language machine translation of Miyuki et al. (JP 2012-150933 A) (Year: 2012).*
(Continued)

*Primary Examiner* — Matthew R Diaz
(74) *Attorney, Agent, or Firm* — Birch, Stewart, Kolasch & Birch, LLP (57) ABSTRACT

An object of the present disclosure is to provide a new sulfur-based positive-electrode active material which can improve cyclability of a lithium-ion secondary battery while maintaining a charging and discharging capacity, a positive-electrode comprising the positive-electrode active material, and a lithium-ion secondary battery comprising the positive-electrode. The sulfur-based positive-electrode active material is one comprising doped nitrogen atoms obtainable by heat-treating a starting material comprising a chain organic compound and sulfur under an atmosphere of a nitrogen atom-doping gas.

13 Claims, 2 Drawing Sheets

(51) Int. Cl.
    *H01M 4/38*     (2006.01)
    *H01M 4/62*     (2006.01)
    *H01M 10/0525*     (2010.01)

(52) U.S. Cl.
    CPC ....... *H01M 4/625* (2013.01); *H01M 10/0525* (2013.01); *H01M 2004/028* (2013.01)

(58) Field of Classification Search
    CPC .... H01M 4/1399; H01M 4/362; H01M 4/364; H01M 4/38; H01M 4/621; H01M 4/622; H01M 4/625; H01M 10/0525; H01M 2004/028; H01B 1/04; H01B 1/06; H01B 1/10; C01B 17/22; C01B 17/24; C01B 17/26; C01B 17/28; C08C 19/20; C08C 19/22; C08F 8/30; C08F 8/34
    See application file for complete search history.

(56) References Cited

U.S. PATENT DOCUMENTS

| | | | |
|---|---|---|---|
| 2001/0033971 | A1 | 10/2001 | Zhao et al. |
| 2014/0272592 | A1* | 9/2014 | Thompkins ........... H01M 4/134 429/231.8 |
| 2016/0204408 | A1* | 7/2016 | Herle .................... H01M 4/382 429/143 |
| 2016/0293955 | A1* | 10/2016 | Hochi ................... H01M 4/583 |
| 2017/0062809 | A1* | 3/2017 | Kubo ............... H01M 10/0525 |
| 2017/0125800 | A1* | 5/2017 | Zhang .................... H01M 4/38 |
| 2017/0263937 | A1* | 9/2017 | Zhao ...................... C08L 27/16 |
| 2017/0288225 | A1* | 10/2017 | Kubo ...................... C01B 19/04 |
| 2017/0358800 | A1* | 12/2017 | Sun ..................... H01M 4/0404 |
| 2018/0287207 | A1* | 10/2018 | Dai ....................... H01M 4/625 |

FOREIGN PATENT DOCUMENTS

| | | | | |
|---|---|---|---|---|
| JP | 2012-150933 | A | | 8/2012 |
| JP | 2012150933 | A | * | 8/2012 |
| JP | 2015-92449 | A | | 5/2015 |
| KR | 20180099572 | A | * | 9/2018 ........ H04M 1/72436 |

OTHER PUBLICATIONS

English language machine translation of Kim et al. (KR 2018-0099572 A) (Year: 2018).*

* cited by examiner

SULFUR-BASED POSITIVE-ELECTRODE ACTIVE MATERIAL, POSITIVE-ELECTRODE AND LITHIUM-ION SECONDARY BATTERY

TECHNICAL FIELD

The present invention relates to a new sulfur-based positive-electrode active material which can be used for a lithium-ion secondary battery, an electrode comprising the sulfur-based positive-electrode active material and a method of producing a lithium-ion secondary battery comprising the electrode.

BACKGROUND ART

Since a lithium-ion secondary battery, one type of non-aqueous electrolyte secondary batteries, has a large charging and discharging capacity, it has been used mainly as a battery for portable electronic devices. Moreover, the number of lithium-ion secondary batteries as batteries for electrically-driven vehicles has been increasing, and performance thereof has been expected to be improved.

Generally, materials compounding a rare metal such as cobalt or nickel are used as a positive-electrode active material of a lithium-ion secondary battery. However, due to the fact that rare metals are small in the distributed amount, not always easily available and additionally expensive, a positive-electrode active material using a material that can replace the rare metals has been required. Further, in the case of a positive-electrode active material comprising an oxidized compound, oxygen in the positive-electrode active material is released due to overcharging or the like, and as a result, an organic electrolyte and a current collector are oxidized and burnt, which may cause firing, explosion and the like.

On the other hand, a technique of using sulfur as a positive-electrode active material is known. In the case where sulfur is used as a positive-electrode active material, this sulfur is easily available and inexpensive and has a further advantage that a charging and discharging capacity of a lithium-ion secondary battery can be made larger, compared to rare metals. For example, it is known that a lithium-ion secondary battery using sulfur as a positive-electrode active material can achieve about 6 times larger charging and discharging capacity than a lithium-ion secondary battery using lithium cobalt oxide which is a general positive-electrode material. Further, sulfur is low in reactivity compared to oxygen, and there is a less risk of firing, explosion and the like caused by overcharging. However, the lithium-ion secondary battery using elemental sulfur as the positive-electrode active material has a problem that a battery capacity is deteriorated through repeated charging and discharging. That is, since sulfur is likely to generate a compound with lithium when discharging and the generated compound is soluble into a nonaqueous electrolyte (for example, ethylene carbonate, dimethyl carbonate and the like) of the lithium-ion secondary battery, the charging and discharging capacity is gradually reduced through repeated charging and discharging due to the sulfur eluting into the electrolyte. Therefore, in order to inhibit elution of sulfur into the electrolyte and improve cyclability (characteristic of maintaining a charging and discharging capacity irrespective of repeated charging and discharging), a positive-electrode active material comprising a material other than sulfur (for example, a carbon material) in addition to sulfur has been proposed.

For example, JP 2002-154815 A discloses a technique of using a given polycarbon sulfide comprising carbon and sulfur as main component elements. Further, J P 2012-150933 A discloses a sulfur-based positive-electrode active material obtained by heat-treating a mixture of polyisoprene and sulfur powder. However, there is a room for improvement of cyclability of a lithium-ion secondary battery.

SUMMARY OF THE INVENTION

Problem to be Solved by the Invention

An object of the present invention is to provide a new sulfur-based positive-electrode active material which can improve cyclability of a lithium-ion secondary battery while maintaining a charging and discharging capacity, a positive-electrode comprising the positive-electrode active material, a lithium-ion secondary battery comprising the positive-electrode, and production methods thereof.

Means to Solve the Problem

The present inventors have made intensive studies to solve the above-mentioned problem and as a result, have found that a sulfur-based positive-electrode active material being capable of improving cyclability while maintaining a charging and discharging capacity can be produced and provided by using a nitrogen atom-doping gas atmosphere as an atmosphere used for heat treatment when preparing the sulfur-based positive-electrode active material by heat-treating a starting material comprising a chain organic compound and sulfur. The present inventors have made further studies and have completed the present invention.

That is, the present invention relates to:

[1] a sulfur-based positive-electrode active material comprising doped nitrogen atoms obtainable by heat-treating a starting material comprising a chain organic compound and sulfur under an atmosphere of a nitrogen atom-doping gas,
[2] the sulfur-based positive-electrode active material of the above [1], wherein the chain organic compound is a diene rubber,
[3] the sulfur-based positive-electrode active material of the above [1], wherein the chain organic compound is a high-cis butadiene rubber,
[4] the sulfur-based positive-electrode active material of any one of the above [1] to [3], wherein the nitrogen atom-doping gas is ammonia gas,
[5] the sulfur-based positive-electrode active material of any one of the above [1] to [4], wherein a heat-treating temperature at the heat treatment is from 250° C. to 550° C., more preferably from 300° C. to 450° C.,
[6] the sulfur-based positive-electrode active material of any one of the above [1] to [5], wherein the starting material further comprises an electrically conductive carbon material,
[7] the sulfur-based positive-electrode active material of the above [6], wherein the electrically conductive carbon material is a carbon material having a graphite structure,
[8] the sulfur-based positive-electrode active material of any one of the above [1] to [7], wherein a sulfur content is not less than 45.0% by mass, more preferably not less than 50.0% by mass, further preferably not less than 51.0% by mass, further preferably not less than 52.0% by mass, further preferably not less than 53.0% by mass, further preferably not less than 54.0% by mass, further preferably not less than 55.0% by mass,

[9] a positive-electrode comprising the sulfur-based positive-electrode active material of any one of the above [1] to [8],
[10] a lithium-ion secondary battery comprising the positive-electrode of the above [9],
[11] a method of producing a sulfur-based positive-electrode active material comprising doped nitrogen atoms, the method comprising:
(1) a step of preparing a starting material comprising a chain organic compound and sulfur, and
(2) a step of heat-treating the starting material under an atmosphere of a nitrogen atom-doping gas,
[12] the method of producing a sulfur-based positive-electrode active material of the above [11], wherein a heat-treating temperature at the heat treatment is from 250° C. to 550° C., more preferably from 300° C. to 450° C.,
[13] the method of producing a sulfur-based positive-electrode active material of the above [11] or [12], wherein the starting material further comprises an electrically conductive carbon material,
[14] the method of producing a sulfur-based positive-electrode active material of any one of the above [11] to [13], wherein the chain organic compound is a diene rubber,
[15] the method of producing a sulfur-based positive-electrode active material of any one of the above [11] to [13], wherein the chain organic compound is a high-cis butadiene rubber,
[16] the method of producing a sulfur-based positive-electrode active material of any one of the above [11] to [15], wherein the nitrogen atom-doping gas is ammonia gas,
[17] the method of producing a sulfur-based positive-electrode active material of the above [13], wherein the electrically conductive carbon material is a carbon material having a graphite structure,
[18] the method of producing a sulfur-based positive-electrode active material of any one of the above [11] to [17], wherein a sulfur content in the sulfur-based positive-electrode active material is not less than 45.0% by mass, more preferably not less than 50.0% by mass, further preferably not less than 51.0% by mass, further preferably not less than 52.0% by mass, further preferably not less than 53.0% by mass, further preferably not less than 54.0% by mass, further preferably not less than 55.0% by mass,
[19] a method of producing a positive-electrode, wherein after producing the sulfur-based positive-electrode active material by the method of producing a sulfur-based positive-electrode active material of any one of the above [11] to [18], the method further comprises:
(3) a step of producing a positive-electrode comprising the sulfur-based positive-electrode active material by a usual method, and
[20] a method of producing a lithium-ion secondary battery, wherein after producing a positive-electrode by the method of producing a positive-electrode of the above [19], the method further comprises:
(4) a step of producing a lithium-ion secondary battery comprising the positive-electrode by a usual method.

Effect of the Invention

According to the present invention, it is possible to produce and provide a new sulfur-based positive-electrode active material which can improve cyclability of a lithium-ion secondary battery while maintaining a charging and discharging capacity, a positive-electrode comprising the positive-electrode active material, and a lithium-ion secondary battery comprising the positive-electrode.

Herein, "cyclability" means a characteristic of maintaining a charging and discharging capacity of a secondary battery irrespective of repeated charging and discharging. Therefore, a secondary battery showing a large degree of reduction of a charging and discharging capacity and a low capacity retention rate by repeated charging and discharging is inferior in cyclability, and on the contrary, a secondary battery showing a small degree of reduction of a charging and discharging capacity and a high capacity retention rate is excellent in cyclability.

DESCRIPTION OF EMBODIMENTS

The constituents of the present disclosure will be described below in detail.
<Sulfur-Based Positive-Electrode Active Material>
In one aspect, the present disclosure relates to a sulfur-based positive-electrode active material comprising doped nitrogen atoms obtainable by heat-treating a starting material comprising a chain organic compound and sulfur under an atmosphere of a nitrogen atom-doping gas.

While not intending to be bound in any way by theory, it can be considered that in the present disclosure, a mechanism of an excellent effect exhibited by the sulfur-based positive-electrode active material is as mentioned below. Firstly, it can be considered that, in a heat treatment step, a sulfur-based positive-electrode active material is prepared through generation of sulfides by reaction of a chain organic compound with sulfur in concert with incorporation of sulfur into the active material by amorphization or vaporization of solid sulfur (S8) (denaturation of sulfur). Here, by using a nitrogen atom-doping gas as an atmosphere, a sulfur-based positive-electrode active material comprising doped nitrogen atoms can be obtained. In this sulfur-based positive-electrode active material comprising doped nitrogen atoms, it can be considered that there exist polarization and the like at a doped portion. Accordingly, polysulfide ions generated at the positive-electrode are easily adsorbed on this doped portion, and the adsorbed polysulfide ions are hardly moved toward a negative-electrode, thereby making the polysulfide ions contribute to a charging and discharging reaction repeatedly at the positive electrode. As a result, it is conjectured that lowering of a capacity retention rate is suppressed more.

In order to introduce nitrogen atoms into an active material, a compound having nitrogen atoms can be used as a starting material, but in that case, there is a drawback that compounds being applicable or compounds exhibiting an effect are limited. In this regard, in the present disclosure, there is an advantage that even if a compound having nitrogen atoms is not selected as a starting material, nitrogen atoms can be introduced into an active material.

(Chain Organic Compound)

The chain organic compound is an organic compound comprising a carbon principal chain which may have a side chain. Examples of the chain organic compound include linear or branched hydrocarbons such as alkane, alkene and alkyne. Further, the chain organic compound may be subjected to substitution with one or more commonly used functional groups. Examples of such a commonly used functional group include carboxyl, hydroxyl, aldehyde, thiol, sulfonyl, alkoxycarbonyl, amino, aminocarbonyl and the like.

From the viewpoint of securing reactivity with sulfur, the chain organic compound is preferably one having a boiling point higher than a radicalization temperature of sulfur. The radicalization temperature of sulfur is usually about 160° C. The boiling point of the chain organic compound is preferably 170° C. or higher, preferably 180° C. or higher, preferably 200° C. or higher. On the other hand, an upper limit of the boiling point is not limited particularly, and a molecular weight of the chain organic compound is preferably not more than 7,000,000, more preferably not more than 6,000,000, further preferably not more than 5,000,000, further preferably not more than 3,000,000, further preferably not more than 1,000,000. The number of carbon atoms constituting the chain organic compound varies depending on kind of a functional group of the chain organic compound, and when the chain organic compound is a chain carboxylic acid, the number of carbon atoms thereof is preferably 4 or more. Examples of the chain carboxylic acid having 4 carbon atoms include butyric acid and crotonic acid. Generally, the number of carbon atoms of the chain organic compound is preferably 5 or more, more preferably 6 or more, more preferably 8 or more. On the other hand, an upper limit of the number of carbon atoms is not limited particularly as long as an effect of the present disclosure is not impaired, and is usually preferably not more than 600,000, more preferably not more than 500,000, further preferably not more than 300,000, further preferably not more than 100,000, further preferably not more than 10,000.

Example of the chain organic compound includes a rubber (specifically unvulcanized rubber) which is an aggregate of long chain organic compounds comprising a carbon principal chain optionally having a side chain, or a compound having a carboxyl group as a substituent on a carbon principal chain optionally having a side chain. These chain organic compounds may be subjected to substitution with one or more of the above-mentioned functional groups.

Examples of the rubber include preferably a diene rubber such as a natural rubber, an isoprene rubber, a butadiene rubber and the like and one or more thereof may be suitably used. Among them, a natural rubber and a high-cis polybutadiene rubber are particularly preferable. Since the both rubbers are apt to have an irregular structure in which molecular chains wind, it is possible to hardly cause crystallization by making intermolecular forces between adjacent molecular chains relatively small, whereby flexibility and processability of a sulfur-based positive-electrode active material can be improved. It is particularly preferable to use a butadiene rubber such as a high-cis polybutadiene rubber. Here, the high-cis polybutadiene rubber is a polybutadiene rubber having a large amount of cis 1,4-bond. The amount of cis 1,4-bond is, for example, preferably not less than 95% by mass, more preferably not less than 96% by mass, further preferably not less than 97% by mass, further preferably not less than 98% by mass. The amount of cis 1,4-bond is calculated by an infrared absorption spectrum analysis.

Examples of a compound having a carboxyl group as a substituent on a carbon principal chain optionally having a side chain include fatty acids. One or more of fatty acids can be used in combination. Example of preferred fatty acid includes a fatty acid having 4 to 30 carbon atoms (preferably 12 to 28 carbon atoms), and stearic acid is preferable.

One or more of the chain organic compounds can be used in combination.

(Sulfur)

Sulfur in various forms such as powdery sulfur, insoluble sulfur, precipitated sulfur, colloidal sulfur and the like may be used. Among these, precipitated sulfur and colloidal sulfur are preferable. The compounding amount of sulfur is preferably not less than 250 parts by mass, more preferably not less than 300 parts by mass based on 100 parts of the chain organic compound. When the compounding amount is not less than 250 parts by mass, there is a tendency that a charging and discharging capacity and cyclability can be enhanced. On the other hand, while an upper limit of the compounding amount is not limited particularly, the compounding amount is usually not more than 1,500 parts by mass, preferably not more than 1,250 parts by mass. If the compounding amount of sulfur is more than 1,500 parts by mass, a charging and discharging capacity and cyclability is hardly improved further, and the compounding amount of not more than 1,500 parts by mass tends to be advantageous from the viewpoint of cost.

(Electrically-Conductive Carbon Material)

In the present disclosure, for the purpose of improving electrical conductivity of the obtained sulfur-based positive-electrode active material, a carbon material having electrical conductivity may be further added to the starting material to be heat-treated. A carbon material having a graphite structure is preferable as such an electrically-conductive carbon material. Examples of usable carbon material include carbon materials having a fused aromatic ring structure such as carbon black, acetylene black, Ketjenblack, graphite, carbon nanotube (CNT), carbon fiber (CF), graphene and fullerene. One or more thereof can be used as the electrically conductive carbon material.

Among them, acetylene black, carbon black and Ketjenblack are preferable since these are inexpensive and excellent in dispersibility. Also, a small amount of CNT or graphene may be combined with acetylene black, carbon black or Ketjenblack. In accordance with such combination, cyclability of a lithium-ion secondary battery can be further improved without largely increasing a cost. The combined amount of CNT or graphene is preferably 8 to 12% by mass based on the total amount of electrically-conductive carbon material.

A compounding amount of the electrically-conductive carbon material is preferably not less than 5 parts by mass, more preferably not less than 10 parts by mass based on 100 parts by mass of the chain organic compound. When the compounding amount is not less than 5 parts by mass, there is a tendency that purposes of further improving a charging and discharging capacity and cyclability are easily achieved. On the other hand, the compounding amount is preferably not more than 50 parts by mass, more preferably not more than 40 parts by mass. When the compounding amount is not more than 50 parts by mass, there is a tendency that a ratio of a sulfur-including structure in the sulfur-based positive-electrode active material does not decrease relatively and purposes of further improving a charging and discharging capacity and cyclability are easily achieved.

(Other Materials)

To the starting material to be heat-treated can be added other materials usually used in a related field, if desired.

(Sulfur-Based Positive-Electrode Active Material Comprising Doped Nitrogen Atoms)

The sulfur-based positive-electrode active material comprising doped nitrogen atoms is a sulfur-based positive-electrode active material including nitrogen atoms incorporated from a nitrogen atom-doping gas in a process for forming the sulfur-based positive-electrode active material by heat-treating the starting material. An initial capacity of the sulfur-based positive-electrode active material according to the present disclosure is 500 mAh/g or more.

[Nitrogen Atom-Doping Gas]

The nitrogen atom-doping gas is, when used as an atmosphere gas for heat treatment, a gas functioning to allow the nitrogen atoms to be incorporated into the sulfur-based positive-electrode active material when forming the sulfur-based positive-electrode active material from the starting material by the heat treatment. Any of such gases can be used suitably as the nitrogen atom-doping gas. Examples of the nitrogen atom-doping gas include ammonia gas, nitrous oxide gas and the like, and among these, ammonia gas is preferred.

[Heat Treatment Under Nitrogen Atom-Doping Gas Atmosphere]

The heat treatment under nitrogen atom-doping gas atmosphere can be carried out appropriately by a usual method in a related field, for example, in accordance with the later description about the heat treatment step. In this case, it is preferable that a heat-treating temperature is within a range of from 250° C. to 550° C. When the heat-treating temperature is 250° C. or higher, there is a tendency that insufficient sulfurization reaction is avoided and that decrease in a charging and discharging capacity of the target product is prevented. On the other hand, when the heat-treating temperature is 550° C. or lower, there is a tendency that decomposition of the starting material can be prevented and that decrease in yield and decrease in a charging and discharging capacity can be prevented. The heat-treating temperature is preferably 300° C. or higher and 450° C. or lower. A heat-treating time may be set appropriately according to kind of the starting material, a heat-treating temperature etc., and is preferably, for example, 1 to 6 hours. When the heat-treating time is one hour or longer, there is a tendency that the heat treatment can proceed enough, and when the heat-treating time is six hours or shorter, there is a tendency that excessive thermal degradation of the component elements can be prevented.

(Sulfur-Based Positive-Electrode Active Material)

The sulfur-based positive-electrode active material according to the present disclosure comprises carbon and sulfur as main components, and as an amount of sulfur is larger, a charging and discharging capacity and cyclability tend to be enhanced. Therefore, a larger content of sulfur is preferable. Generally, a preferable amount of sulfur in the sulfur-based positive-electrode active material is preferably not less than 45.0% by mass, more preferably not less than 50.0% by mass, further preferably not less than 51.0% by mass, further preferably not less than 52.0% by mass, further preferably not less than 53.0% by mass, further preferably not less than 54.0% by mass, further preferably not less than 55.0% by mass. However, when an electrically conductive carbon material is compounded, an effect of enhancing a charging and discharging capacity and cyclability can be expected even if a sulfur content is decreased to some extent by an influence of carbon constituting the electrically conductive carbon material. In such a case, the sulfur content may be lower than the above-mentioned sulfur amount by about 5.0% by mass.

Further, the chain organic compound reacts with sulfur by the heat treatment, thereby releasing hydrogen sulfide. Therefore, it is preferable that a hydrogen content of the sulfur-based positive-electrode active material is not more than 1.6% by mass. When the hydrogen content is not more than 1.6% by mass, there is a tendency that heat treatment (sulfurization reaction) is enough. Therefore, in that case, a charging and discharging capacity tends to increase. The hydrogen content is more preferably not more than 1.0% by mass, further preferably not more than 0.5% by mass, further preferably not more than 0.3% by mass, further preferably not more than 0.2% by mass, further preferably not more than 0.1% by mass.

In the sulfur-based positive-electrode active material, from the viewpoint of good capacity retention rate, a nitrogen content is preferably not less than 1.0% by mass, more preferably not less than 1.5% by mass, further preferably not less than 2.0% by mass, further preferably not less than 2.5% by mass, further preferably not less than 3.0% by mass, further preferably not less than 3.5% by mass. Further, from the viewpoint of good initial capacity, the nitrogen content is preferably not more than 15% by mass, more preferably not more than 10% by mass, further preferably not more than 7.5% by mass.

Herein, a content of an element is measured by an elemental analysis in accordance with a usual method.

<Preparation of Sulfur-Based Positive-Electrode Active Material>

In one aspect, the present disclosure relates to a method of preparing a sulfur-based positive-electrode active material comprising doped nitrogen atoms, the method comprising (1) a step of preparing a starting material comprising a chain organic compound and sulfur (step (1)), and (2) a step of heat-treating the starting material under an atmosphere of a nitrogen atom-doping gas (step (2)).

(Step (1))

The step (1) is the step of preparing the starting material comprising the chain organic compound and sulfur to be heat-treated. As preparation for heat treatment of the next step, it is desirable to knead the starting material comprising the chain organic compound and sulfur and/or to pulverize them into fine particles previously. Kneading of the starting material can be performed by a usual method. Further, pulverizing the kneaded product can be performed by grinding the starting material in a mortar or finely cutting the starting material into pieces with scissors. Kneading and pulverizing are effective means for enhancing reactivity in the heat treatment.

(Step (2))

The step (2) is the step of heat-treating the starting material obtained above under an atmosphere of a nitrogen atom-doping gas.

[Nitrogen Atom-Doping Gas]

The nitrogen atom-doping gas is, when used as an atmosphere gas for heat treatment, a gas functioning to allow the nitrogen atoms to be incorporated into the sulfur-based positive-electrode active material when forming the sulfur-based positive-electrode active material from the starting material by the heat treatment. Any of such gases can be used suitably as the nitrogen atom-doping gas. Examples of the nitrogen atom-doping gas include ammonia gas, nitrous oxide gas and the like, and among these, ammonia gas is preferred.

[Heat Treatment]

The heat treatment is a step of heat-treating the starting material under an atmosphere of a nitrogen atom-doping gas. Here, a heat-treating temperature is an ultimate temperature after completion of heating up of the starting material, and is a temperature to be held for a given period of time for the heat treatment of the starting material. It is preferable that a heat-treating temperature is within a range of from 250° C. to 550° C. When the heat-treating temperature is 250° C. or higher, there is a tendency that insufficient sulfurization reaction is avoided and that decrease in a charging and discharging capacity of the target product is prevented. On the other hand, when the heat-treating temperature is 550° C. or lower, there is a tendency that decomposition of the starting material can be prevented and that decrease in yield and decrease in a charging and discharging capacity can be prevented. The heat-treating temperature is preferably 300° C. or higher and 450° C. or lower. A heat-treating time may be set appropriately according to kind of the starting material, a heat-treating temperature etc., and is preferably, for example, 1 to 6 hours. When the heat-treating time is one hour or longer, there is a tendency that the heat treatment can proceed enough, and when the heat-treating time is six hours or shorter, there is a tendency that excessive thermal degradation of the component elements can be prevented. The heat treatment is performed, for example, under nitrogen atom-doping gas atmosphere in a quartz tube.

[Apparatus]

The heat treatment step can be performed using an apparatus usually used in this field for heat treatment. Example of such an apparatus includes one described in FIG. 1. Further, the heat treatment step can also be performed using a continuous apparatus such as a twin-screw extruder. In that case, there is a merit such that the sulfur-based positive-electrode active material can be prepared continuously through a series of operations by heat-treating the starting material while kneading, pulverizing and mixing in the apparatus.

(Residues Removing Step)

In the treated product obtained after the heat treatment, there are residues such as a so-called unreacted sulfur which results from cooling and deposition of sulfur sublimated at the heat treatment. It is desirable to remove such residues as much as possible since it causes deterioration of cyclability. Residues can be removed by usual methods, for example, a removal by heating under a reduced pressure, a removal by warm wind, a removal by washing with a solvent and the like.

(Pulverization and Classification)

The obtained sulfur-based positive-electrode active material is pulverized so as to be predetermined grain sizes and is classified to be particles suitable for production of an electrode. A preferred particle size distribution of the particles is from about 5 to 25 μm in a median size. It is noted that in the above-explained heat treatment method using a twin-screw extruder, the produced sulfur-based positive-electrode active material can also be pulverized at the same time due to shearing at kneading.

<Positive Electrode>

In one aspect, the present disclosure relates to a positive electrode comprising the sulfur-based positive-electrode active material. The positive electrode can be used as a positive electrode for a lithium-ion secondary battery.

The positive electrode for a lithium-ion secondary battery can be formed in the same manner as in a conventional positive electrode for a lithium-ion secondary battery except that the above sulfur-based positive-electrode active material is used as a positive-electrode active material. For example, the positive electrode can be produced by mixing a particulate sulfur-based positive-electrode active material with an electrically-conductive additive, a binder and a solvent to give a paste-like positive-electrode material, applying the positive-electrode material on a collector, and drying to form a positive electrode. Otherwise, it is also possible that the sulfur-based positive-electrode active material of the present disclosure is kneaded together with an electrically-conductive additive, a binder and a small amount of solvent in a mortar or the like, and the kneaded mixture is formed into a film shape and then pressed against a collector using a pressing machine or the like to form a positive electrode.

(Electrically-Conductive Additive)

Examples of an electrically-conductive additive include one or more of vapor grown carbon fibers (Vapor Grown Carbon Fibers: VGCF), carbon powders, carbon black (CB), acetylene black (AB), Ketjenblack (KB), graphite, fine powders of a metal being stable at positive-electrode potentials, such as aluminum, titanium and the like.

(Binder)

Examples of a binder include polyvinylidene fluoride (PVDF), polytetrafluoroethylene (PTFE), styrene-butadiene rubber (SBR), polyimide (PI), polyamide-imide (PAI), carboxymethyl cellulose (CMC), polyvinyl chloride (PVC), methacryl resins (PMA), polyacrylonitrile (PAN), modified polyphenylene oxide (PPO), polyethylene oxide (PEO), polyethylene (PE), polypropylene (PP) and the like. One or more of these binders can be used in combination.

(Solvent)

Examples of a solvent include N-methyl-2-pyrrolidone, N,N-dimethylformaldehyde, alcohols, hexane, water and the like. One or more of these solvents can be used in combination.

(Compounding Amount)

The compounding amount of each of the above materials constituting the positive electrode is not limited particularly but for example, it is preferable to compound 2 to 100 parts by mass of an electrically-conductive additive, 2 to 50 parts by mass of a binder and an appropriate amount of a solvent based on 100 parts by mass of the sulfur-based positive-electrode active material.

(Collector)

As for a collector, those which have been used commonly as positive electrodes for a lithium-ion secondary battery may be used. Examples of a collector include aluminum foils, aluminum meshes, punched aluminum sheets, aluminum expanded sheets, stainless-steel foils, stainless-steel meshes, punched stainless-steel sheets, stainless-steel expanded sheets, foamed nickel, nickel nonwoven fabrics, copper foils, copper meshes, punched copper sheets, copper expanded sheets, titanium foils, titanium meshes, carbon nonwoven fabrics, carbon woven fabrics and the like. Among these, a carbon nonwoven fabric collector and/or a carbon woven fabric collector, which is composed of carbon with high graphitization degree, is suitable for a collector for the sulfur-based positive-electrode active material because it does not include hydrogen and has low reactivity to sulfur. As for a raw material for carbon fiber with high graphitization degree, it is possible to use various types of pitches (namely, the byproducts of petroleum, coal, coal tar, and so on) or polyacrylonitrile fibers (PAN) and the like that can be a material for carbon fibers.

<Lithium-Ion Secondary Battery>

In one aspect, the present disclosure relates to the lithium-ion secondary battery comprising the above-mentioned positive electrode.

The lithium-ion secondary battery can be produced in the same manner as in general lithium-ion secondary batteries except that the above-mentioned positive electrode is used as the positive electrode. For example, the lithium-ion secondary battery can be produced by a usual method using the above-mentioned positive electrode comprising the sulfur-based positive-electrode active material, the negative electrode, the electrolyte and further, if desired, a member such as a separator. The thus produced lithium-ion secondary battery has a large charging and discharging capacity and is excellent in cyclability.

(Negative Electrode)

Examples of a negative electrode material include known metallic lithium, carbon-based materials such as graphite, silicon-based materials such as a silicon thin film, alloy-based materials such as copper-tin or cobalt-tin and the like. In the case where a material that does not comprise lithium such as a carbon-based material, a silicon-based material, an alloy-based material and the like is used as a negative electrode material, it is advantageous since the short-circuiting between positive and negative electrodes, which results from production of dendrite, is less likely to arise. However, in the case where a negative electrode material that does not comprise lithium is used in combination with the positive electrode of the present disclosure, neither the positive electrode nor the negative electrode includes lithium and thus a pre-doping treatment, in which lithium is inserted into either one of the negative electrode and positive electrode, or into both of them, becomes necessary. For a method of pre-doping, a publicly known method can be used. For example, in the case where a negative electrode is doped with lithium, the following methods can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied as it is in an electrolytic solution. Moreover, in another case as well where the positive electrode is pre-doped with lithium, it is possible to utilize the aforementioned electrolytically-doping method. A silicon-based material, which is a high capacity negative electrode material, is preferable as a negative electrode material that does not comprise lithium. Among them, a silicon thin film that can make a thickness of the electrode thinner and is advantageous in capacity per volume is more preferable.

(Electrolyte)

As for an electrolyte to be used for the lithium-ion secondary battery, it is possible to use those in which an alkali-metal salt serving as an electrolyte is dissolved in an organic solvent. Examples of an organic solvent include at least one selected from nonaqueous solvents, such as ethylene carbonate, propylene carbonate, dimethyl carbonate, diethyl carbonate, ethyl methyl carbonate, dimethyl ether, γ-butyrolactone and acetonitrile. Examples of an electrolyte include $LiPF_6$, $LiBF_4$, $LiAsF_6$, $LiCF_3SO_3$, $LiI$, $LiClO_4$ and the like. A concentration of the electrolyte can be from about 0.5 mol/liter to about 1.7 mol/liter. It is noted that the electrolyte is not limited to a liquid form. For example, in the case where the lithium-ion secondary battery is a lithium polymer secondary battery, the electrolyte is a solid form (for example, a form of polymer gel).

(Separator)

The lithium-ion secondary battery can be provided with a member such as a separator in addition to the above-mentioned positive electrode, negative electrode and electrolyte. A separator intervenes between the positive electrode and the negative electrode, thereby not only allowing the movements of ions between the positive electrode and the negative electrode but also functioning to prevent the positive electrode and the negative electrode from internally short-circuiting one another. When the lithium-ion secondary battery is a hermetically-closed type, the separator is required to have a function of retaining the electrolytic solution. As for a separator, it is preferable to use a thin-thickness and microporous or nonwoven-shaped film that is made from a material, such as polyethylene, polypropylene, polyacrylonitrile, aramide, polyimide, cellulose and glass.

(Configuration)

A configuration of the lithium-ion secondary battery is not limited particularly, and can be formed as a variety of configurations, such as cylindrical types, laminated types, coin types, button types and the like.

<Clarity>

In the present disclosure, the sulfur-based positive-electrode active material has a process feature "obtainable by heat-treating . . . under an atmosphere of a nitrogen atom-doping gas". However, Table 1 of the instant application shows that even if the same starting material is used, performances of the obtained sulfur-based positive-electrode active materials differ from each other depending on a difference of temperature in the heat-treatment. In other words, it shows that, when lithium ion secondary batteries are produced using those sulfur-based positive-electrode active materials and are evaluated, charging and discharging capacities and capacity retention rates thereof are different largely (comparison among Example 2 heat-treated at 450° C., Comparative Example 3 heat-treated at 200° C. and Comparative Example 4 heat-treated at 600° C.). Namely, it is evident that the different sulfur-based positive-electrode active materials are obtained depending on a heat-treating temperature. Under the circumstance, it is not practical and even almost impossible to exactly specify such a sulfur-based positive-electrode active material as a product by structure or property but not by process feature. Therefore, the present disclosure according to the sulfur-based positive-electrode active material is clear.

EXAMPLE

The present disclosure is explained by means of Examples, but is not limited to the Examples.

Various chemicals used herein are collectively shown below. The various chemicals were subjected to purification according to necessity by a usual method.

<Materials Used for Test>

Chain organic compound 1: High cis butadiene rubber (BR150L, content of cis 1,4-bond: 98% by mass, available from Ube Industries, Ltd.)

Chain organic compound 2: Stearic acid (available from Tokyo Chemical Industry Co., Ltd.)

Sulfur: Precipitated sulfur (available from Tsurumi Chemical Industry Co., Ltd.)

Electrically conductive carbon material: Acetylene black (Denka Black available from Denki Kagaku Kogyo Kabushiki Kaisha)

NH$_3$: Ammonia gas (available from Sumitomo Seika Chemicals Co., Ltd.)
N$_2$: Nitrogen gas (available from Air Liquide Japan, Ltd.)

Example 1

<Production of Sulfur-Based Positive-Electrode Active Material>
(Preparation of a Starting Material)

A starting material was prepared by kneading materials compounded according to the formulation of Table 1 using a kneader (a kneading testing device MIX-LABO manufactured by Moriyama Company, Ltd.). The thus obtained starting material was further formed into a powder in a mortar and was then subjected to heat treatment.

(Reaction Apparatus)

Figure 1:
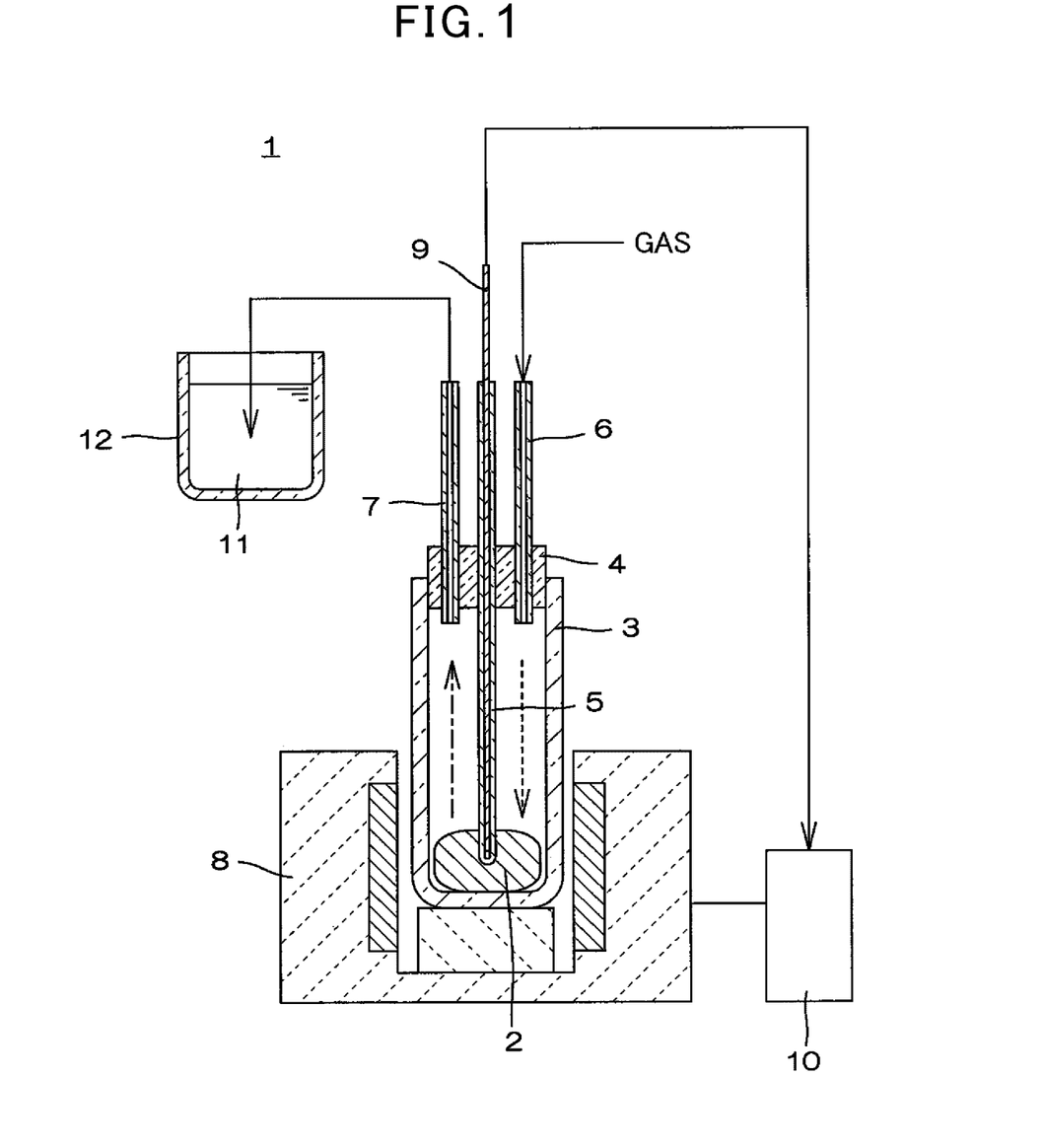
FIG. 1 is a sectional view schematically illustrating a reaction apparatus used for a production of a sulfur-based positive-electrode active material in Examples.

A reaction apparatus 1 as illustrated in FIG. 1 was used for a heat treatment of the starting material. The reaction apparatus 1 comprises a reaction container 3, which has an outer diameter of 60 mm, an inner diameter of 50 mm and a height of 300 mm and made of quartz glass, that is formed as a bottomed cylindrical shape to contain and heat-treat the starting material 2; a silicone lid 4 for closing an upper opening of the reaction container 3; one alumina protection tube 5 ("Alumina SSA-S" manufactured by Nikkato Corporation, outer diameter: 4 mm, inner diameter: 2 mm, length: 250 mm), and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm); and an electric furnace 8 (crucible furnace, width of an opening: 80 mm dia., heating height: 100 mm) for heating the reaction container 3 from the bottom side.

The alumina protection tube 5 is formed in such a length that the downward part lower than the silicone lid 4 reaches the starting material 2 contained in the bottom of the reaction container 3 and a thermocouple 9 is inserted through the inside of the alumina protection tube 5. The alumina protection tube 5 is used as a protective tube for the thermocouple 9. The leading end of the thermocouple 9 is inserted into the starting material 2 while being protected by the closed leading end of the alumina protection tube 5 and functions to measure a temperature of the starting material 2. The output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas discharging tube 7 are formed such that the bottom ends thereof project in 3 mm downwardly from the silicone lid 4. Also, the upper part of the reaction container 3 projects from the electric furnace 8 to be exposed to atmosphere. Therefore, steam of sulfur generating from the starting material due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the gas discharging tube 7.

The gas introducing tube 6 is continuously supplied with an atmosphere gas from a gas supply system which is not shown. The gas discharging tube 7 is connected to a trapping bath 12 containing a sodium hydroxide aqueous solution 11. The exhaust gas moving toward the outside through the gas discharging tube 7 from the reaction container 3 is released to the outside after passing through the sodium hydroxide aqueous solution 11 in the trapping bath 12. Therefore, even if hydrogen sulfide gas generated from a vulcanization reaction is included in the exhaust gas, the hydrogen sulfide gas is removed therefrom by being neutralized with the sodium hydroxide aqueous solution.

(Heat Treatment Step)

In a heat treatment step, a heating with the electric furnace 8 was started 30 minutes after starting a continuous supply of an atmosphere gas to the reaction container 3 holding the starting material 2 in its bottom at a flow rate of 100 ml/min from the gas supply system. When the temperature of the starting material 2 reached 450° C., a heat treatment was conducted for two hours while maintaining the temperature of 450° C. Then, a reaction product was cooled naturally under an atmosphere gas to 25° C. while adjusting the flow rate of the atmosphere gas, and the reaction product was taken out of the reaction container 3.

(Removal of Unreacted Sulfur)

In order to remove the unreacted sulfur (free elemental sulfur) remaining in the product after the heat treatment step, the following step was carried out. Namely, the product was pulverized in a mortar and 2 g of a pulverized product was put in a glass tube oven and heated for three hours at 250° C. while vacuum suction was conducted to produce a sulfur-based positive-electrode active material in which unreacted sulfur was removed (or only a trace amount of unreacted sulfur was contained). The temperature elevation rate was 10° C./min.

<Production of Lithium-Ion Secondary Battery>
(Positive Electrode)

A mixture of 3 mg of the sulfur-based positive-electrode active material as produced above, 2.7 mg of acetylene black and 0.3 mg of polytetrafluoroethylene (PTFE) was kneaded in an agate mortar till the mixture turned into a film shape while adding an appropriate amount of hexane to the mixture. Thus, a positive-electrode material in a film shape was obtained. Then the entire amount of the positive-electrode material was press-fitted, with a pressing machine, onto an aluminum mesh (#100 in mesh roughness) that had been punched out to a circle with 14 mm in diameter, and the film was dried overnight at 80° C. to form a positive electrode.

(Negative Electrode)

A metallic lithium foil (a shape of a circle having a diameter of 14 mm and a thickness of 500 μm, manufactured by Honjo Metal Co., Ltd.) was used as a negative electrode.

(Electrolyte)

A nonaqueous electrolyte in which LiPF$_6$ had been dissolved in a mixture solvent of ethylene carbonate and diethyl carbonate was used as an electrolyte. A volume ratio of ethylene carbonate and diethyl carbonate was 1:1. A concentration of LiPF$_6$ in the electrolyte was 1.0 mol/liter.

(Lithium-Ion Secondary Battery)

Using the above positive electrode, negative electrode and electrolyte, a coin-type battery was produced. Specifically, in a dry room, a separator (Celgard (registered trademark) 2400 manufactured by Celgard, a polypropylene microporous film with 25 μm in thickness) and a glass nonwoven filter (GA100 available from ADVANTEC, thickness: 440 μm) were sandwiched between the positive electrode and the negative electrode to form an electrode-assembly battery. Then, the formed electrode-assembly battery was accommodated in a battery case (a member for CR2032-type coin battery, a product of HOSEN Co., Ltd.) made of a stainless-steel container and the electrolyte solution was added thereto. After that, the battery case was sealed hermetically with a crimping machine, thereby obtaining a coin-type lithium-ion secondary battery.

Examples 2 and 3 and Comparative Examples 1 to 4

A starting material, a sulfur-based positive-electrode active material and a lithium-ion secondary battery were prepared in the same manner as in Example 1 except that the formulations and the conditions for the heat treatment step shown in Table 1 were used.

<Elemental Analysis>

An elemental analysis of sulfur-based positive-electrode active materials produced in Examples and Comparative Example was carried out.

As for carbon (C), hydrogen (H) and nitrogen (N), a mass ratio (%) based on a total amount of a sulfur-based positive-electrode active material was calculated from a mass amount measured with a full automatic elemental analysis device vario MICRO cube manufactured by Elementar Analysensysteme GmbH. As for sulfur (S), a mass ratio (%) based on a total amount of a sulfur-based positive-electrode active material was calculated from a mass amount measured with an ion chromatograph device DX-320 manufactured by Dionex Corporation using a column (IonPac AS12A) manufactured by the same Corporation.

<Measurement of Charging and Discharging Capacity and Capacity Retention Rate>

With respect to each coin-type lithium-ion secondary battery prepared in Examples and Comparative Examples, charging and discharging were carried out at an electric-current value equivalent to 33.3 mA per 1 g of the sulfur-based positive-electrode active material under a condition of a test temperature of 30° C.

The discharge termination voltage was 1.0 V and the charging termination voltage was 3.0 V. Charging and discharging was repeated, each discharging capacity (mAh/g) was measured and a discharging capacity (mAh/g) at the second discharging was regarded as an initial capacity. The larger the initial capacity is, the larger the charging and discharging capacity of the lithium-ion secondary battery is and which is evaluated as preferable. Moreover, from a charging and discharging capacity $DC_{10}$ (mAh/g) at the tenth discharging and a charging and discharging capacity $DC_{30}$ (mAh/g) at the thirtieth discharging, a capacity retention rate (%) was calculated by the formula (a):

Capacity retention rate (%)=$(DC_{30}/DC_{10}) \times 100$

As explained above, it can be said that the higher the capacity retention rate is, the more excellent cyclability of the lithium-ion secondary battery is.

<X-Ray Photoelectron Spectroscopy (XPS)>

Figure 2:
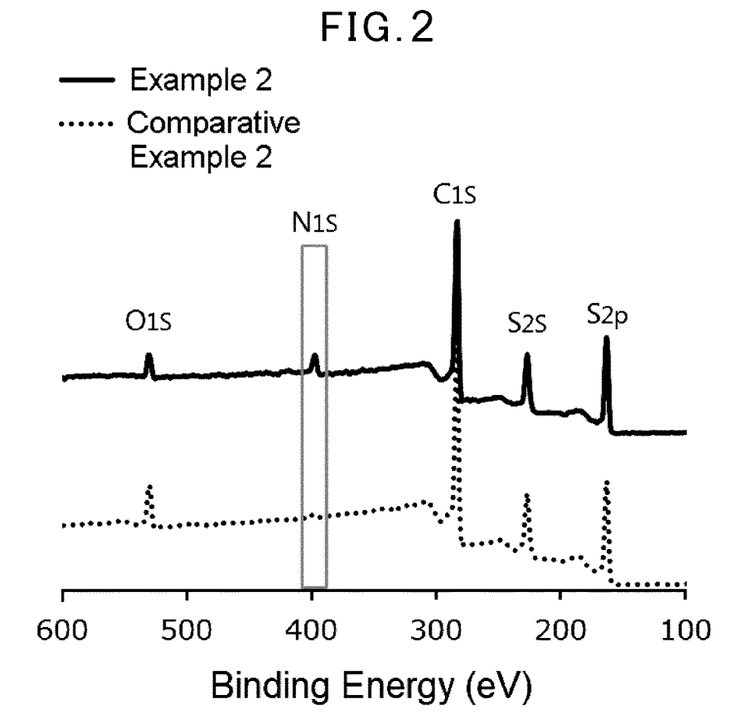
FIG. 2 shows results of an analysis of the sulfur-based positive-electrode active materials of Example 2 and Comparative Example 2 by an X-ray photoelectron spectroscopy (XPS, wide scan).
Figure 3:
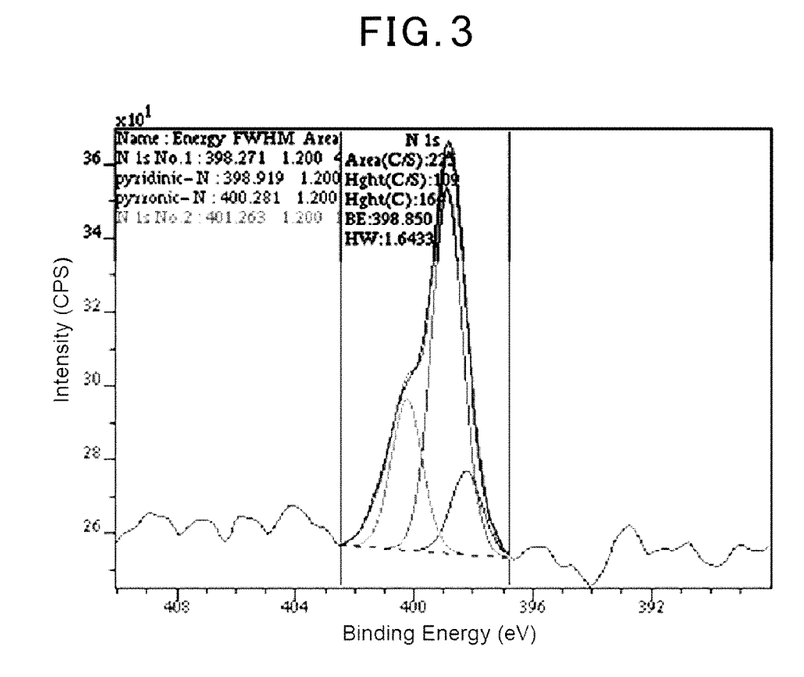
FIG. 3 shows an enlarged peak of 1s orbital of nitrogen atom of Example 2 in FIG. 2 and a result of waveform analysis thereof.

With respect to the sulfur-based positive-electrode active material, a state of the introduced nitrogen atoms was measured by an X-ray photoelectron spectroscopy using KRATOS AXIS-ULTRA (manufactured by Shimadzu Corporation). The results are shown in FIG. 2 and FIG. 3.

TABLE 1

|  | Example | | | Comparative Example | | | |
| --- | --- | --- | --- | --- | --- | --- | --- |
|  | 1 | 2 | 3 | 1 | 2 | 3 | 4 |
| Positive electrode active material Formulation (part by mass) | | | | | | | |
| Chain organic compound 1 | 100 | 100 | — | 100 | 100 | 100 | 100 |
| Chain organic compound 2 | — | — | 100 | — | — | — | — |
| Sulfur | 1000 | 1000 | 1000 | 1000 | 1000 | 1000 | 1000 |
| Electrically conductive carbon material | — | 20 | 20 | — | 20 | 20 | 20 |
| Heat treatment step | | | | | | | |
| Temperature (° C.) | 450 | 450 | 450 | 450 | 450 | 200 | 600 |
| Atmosphere gas | $NH_3$ | $NH_3$ | $NH_3$ | $N_2$ | $N_2$ | $NH_3$ | $NH_3$ |
| Elemental analysis (%) | | | | | | | |
| C | 41.4 | 42.6 | 43.9 | 40.6 | 44.3 | 57.8 | 65.2 |
| H | 0.2 | 0.2 | 0.1 | 0.2 | 0.2 | 2.1 | 0.1 |
| N | 3.9 | 4.3 | 3.9 | 0.1 | 0.1 | 2.3 | 6.4 |
| S | 55.1 | 52.5 | 51.1 | 58.9 | 55.8 | 37.1 | 30.1 |
| Evaluation Discharging capacity (mAh/g) | | | | | | | |
| 1st time | 923 | 861 | 799 | 941 | 910 | 116 | 355 |
| 2nd time | 617 | 553 | 511 | 623 | 597 | 74 | 189 |
| 10th time | 531 | 515 | 465 | 492 | 521 | 53 | 146 |
| 30th time | 467 | 501 | 451 | 419 | 473 | 49 | 139 |
| Capacity retention rate (%) | 87.9 | 97.3 | 97.0 | 85.2 | 90.8 | 92.5 | 95.2 |

It was confirmed by the elemental analysis that nitrogen atoms had been introduced into the sulfur-based positive-electrode active material by heat-treatment in an ammonia gas atmosphere.

FIG. 2 shows data on the sulfur-based positive-electrode active materials of Example 2 and Comparative Example 2 by XPS (wide scan). In FIG. 2, it is confirmed that while a peak (N1s) of 1 s orbital of nitrogen atoms around about 400 eV was not found in Comparative Example 2, the peak appeared in Example 2 in which heat treatment was carried out in an ammonia gas atmosphere, and that nitrogen atoms had been introduced in Example 2.

FIG. 3 shows an enlarged N1s peak of Example 2 in FIG. 2, and a result of division by waveform analysis of the peak into each peak of N1s No. 1 (398.271 eV), a pyridine type (398.919 eV), a pyrrole type (400.281 eV) and N1s No. 2 (401.263 eV). From this, there was a suggestion that the nitrogen atoms introduced into the sulfur-based positive-electrode active material include those constructing a π conjugated structure of heterocyclic aromatic compounds such as pyridine and pyrrole.

From the above Table 1, an initial capacity of the sulfur-based positive-electrode active material according to the present disclosure is preferably 500 mAh/g or more, and the capacity retention rate is preferably 87% or more.

INDUSTRIAL APPLICABILITY

According to the present disclosure, a new sulfur-based positive-electrode active material which can improve cyclability of a lithium-ion secondary battery while maintaining a charging and discharging capacity, a positive-electrode comprising the positive-electrode active material, and a lithium-ion secondary battery comprising the positive-electrode can be prepared and provided.

EXPLANATION OF SYMBOLS

1 Reaction apparatus
2 Starting material
3 Reaction container
4 Silicone lid
5 Alumina protection tube
6 Gas introducing tube
7 Gas discharging tube
8 Electric furnace
9 Thermocouple
10 Temperature controller
11 Sodium hydroxide aqueous solution
12 Trapping bath

What is claimed is:

1. A method of producing a sulfur-based positive-electrode active material comprising doped nitrogen atoms, the method comprising:
   (1) a step of preparing a starting material comprising a chain organic compound and sulfur, and
   (2) a step of heat-treating the starting material under an atmosphere of a nitrogen atom-doping gas,
   wherein the nitrogen atom-doping gas is an ammonia gas or nitrous oxide gas,
   wherein a heat-treating temperature of the heat treatment is from 250° C. to 450° C.,
   wherein an amount of sulfur in the sulfur-based positive-electrode active material is not less than 51.0% by mass, and wherein a nitrogen content in the sulfur-based positive electrode active material is not less than 1.5% by mass and not more than 15% by mass.

2. The method of producing a sulfur-based positive-electrode active material of claim 1, wherein the heat-treating temperature of the heat treatment is from 300° C. to 450° C.

3. The method of producing a sulfur-based positive-electrode active material of claim 1, wherein the starting material further comprises an electrically conductive carbon material.

4. The method of producing a sulfur-based positive-electrode active material of claim 1, wherein the nitrogen atom-doping gas is ammonia gas.

5. The method of producing a sulfur-based positive-electrode active material of claim 1, wherein the chain organic compound is a diene rubber.

6. The method of producing a sulfur-based positive-electrode active material of claim 1, wherein the chain organic compound is a high-cis polybutadiene rubber having a cis 1,4-bond amount of not less than 95% by mass.

7. The method of producing a sulfur-based positive-electrode active material of claim 3, wherein the electrically conductive carbon material is a carbon material having a graphite structure.

8. The method of producing a sulfur-based positive-electrode active material of claim 1, wherein the nitrogen content in the sulfur-based positive electrode active material is not less than 2.0% by mass and not more than 15% by mass.

9. The method of producing a sulfur-based positive-electrode active material of claim 1, wherein the nitrogen content in the sulfur-based positive electrode active material is not less than 3.5% by mass and not more than 15% by mass.

10. The method of producing a sulfur-based positive-electrode active material of claim 1, wherein a hydrogen content in the sulfur-based positive electrode active material is not more than 0.3% by mass.

11. The method of producing a sulfur-based positive-electrode active material of claim 1, wherein a hydrogen content in the sulfur-based positive electrode active material is not more than 0.1% by mass.

12. A method of producing a positive-electrode, wherein after producing the sulfur-based positive-electrode active material by the method of producing a sulfur-based positive-electrode active material of claim 1, the method further comprises:
   (3) a step of producing a positive-electrode comprising the sulfur-based positive-electrode active material.

13. A method of producing a lithium-ion secondary battery, wherein after producing a positive-electrode by the method of producing a positive-electrode of claim 12, the method further comprises:
   (4) a step of producing a lithium-ion secondary battery comprising the positive-electrode.

* * * * *